United States Patent
Tan et al.

(10) Patent No.: US 11,976,231 B2
(45) Date of Patent: *May 7, 2024

(54) HIGHLY AROMATIC AND LIQUID-CRYSTALLINE CO- POLYIMIDES ENDCAPPED WITH AROMATIC GROUPS AND CROSSLINKED PRODUCTS THEREFROM

(71) Applicant: Government of the United States, as represented by the Secretary of the Air Force, Wright-Patterson AFB, OH (US)

(72) Inventors: Loon-Seng Tan, Centerville, OH (US); Zhenning Yu, Beavercreek, OH (US); Bingqian Zheng, Miamisburg, OH (US); Hilmar Koerner, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,100

(22) Filed: Apr. 12, 2023

(65) Prior Publication Data

US 2024/0110098 A1 Apr. 4, 2024

Related U.S. Application Data

(60) Provisional application No. 63/406,006, filed on Sep. 13, 2022.

(51) Int. Cl.
G02F 1/1333 (2006.01)
C09K 19/38 (2006.01)

(52) U.S. Cl.
CPC ................. C09K 19/3823 (2013.01)

(58) Field of Classification Search
CPC ......................... C09K 19/38; C09K 19/3804; C09K 19/3809; C09K 19/3823; C09K 2019/0444; G02F 1/1333
See application file for complete search history.

(56) References Cited

U.S. PATENT DOCUMENTS

| | | | |
|---|---|---|---|
| 5,196,506 | A | 3/1993 | Tamai et al. |
| 5,606,014 | A | 2/1997 | Connell et al. |
| 6,124,035 | A | 9/2000 | Connell et al. |
| 6,350,817 | B1 | 2/2002 | Connell et al. |
| 10,988,437 | B1 | 4/2021 | Tan et al. |
| 11,608,310 | B1 | 3/2023 | Tan et al. |

FOREIGN PATENT DOCUMENTS

| | | | | |
|---|---|---|---|---|
| JP | 2000248252 A | 9/2000 | | |
| JP | 4467662 B2 | 5/2010 | | |
| WO | WO 2022/102757 A1 * | 5/2022 | ............. | B32B 27/34 |
| WO | WO 2023/085184 A1 * | 5/2023 | ............. | B32B 27/00 |

OTHER PUBLICATIONS

U.S. Appl. No. 18/299,090, filed Apr. 12, 2023.
U.S. Appl. No. 18/299,092, filed Apr. 12, 2023.
U.S. Appl. No. 18/299,096, filed Apr. 12, 2023.
U.S. Appl. No. 18/299,353, filed Apr. 12, 2023.
U.S. Appl. No. 18/299,375, filed Apr. 12, 2023.
Nye, S. A.: Polyimides synthesized from 4,4'-(1,2-ethynediyl)bis(phthalic anhydride). Journal of Polymer Science, Part A: Polymer Chemistry 1990, 28, 2633-40.
Pardey, R.; Zhang, A.; Gabori, P. A.; Harris, F. W.; Stephen Z. D. Cheng, S. Z. D.; Jerry Adduci, J.; Facinelli, J. V.; Lenz, R. W.; Monotropic Liquid Crystal Behavior in Two Poly(ester imides) with Even and Odd Flexible Spacers Macromolecules 1992, 25, 5060-5068.
Inoue, T.; Kakimoto, M.-A.; Imai, Y.; Watanabe, J.: First Observation of a Thermotropic Liquid Crystal in a Simple Polyimide Derived from 1,11-Diaminoundecane and 4,4"-Terphenyltetracarboxylic Acid. Macromolecules 1995, 28, 6368-6370.
Inoue, T.; Kumagai, K.; Kakimoto, M.; Imai, Y.; Watanabe, J.; High-Pressure Synthesis and Properties of Aliphatic-Aromatic Polyimides via Nylon-Salt-Type Monomers Derived from Aliphatic Diamines with Pyromellitic Acid and Biphenyltetracarboxylic Acid Macromolecules 1997, 30, 1921-1928.
Kaneko, T. I. Imamura, K.: Watanabe, J.; Reversible Crystal Deformation Observed in the Main-Chain Type of Liquid Crystalline Polyimide, Macromolecules 1997, 30, 4244-4246.
Sato, M.; Ujiie, S.; Tada, Y.; Kato, T. Semirigid: Homo- and Copoly(Imide-Carbonate)s Based on 3,4,3 ,4-p-Terphenyltetracarboxdiimide. High Performance Polymers 1998, 10, 155-162.
Fernberg, P; Guan Gong, G.; Mannberg, P.; Tsampas, S.; Development of novel high Tg polyimide-based composites. Part I: RTM processing properties Journal of Composite Materials 2018, vol. 52(2) 253-260.

(Continued)

*Primary Examiner* — Geraldina Visconti
(74) *Attorney, Agent, or Firm* — AFMCLO/JAZ; James F. McBride

(57) ABSTRACT

A family of low-molecular-weight, main-chain thermotropic liquid-crystalline co-polyimides (TLC-CoPI) that are crosslinkable, and based on a unique, liquid-crystallinity (LC)-enabling diamine, namely, 1,3-bis[4-(4'-aminophenoxy)cumyl]benzene (BACB) and two or more mesogenic dianhydrides, at least one of which is a diphthalic dianhydride (DPA) that contains one or more thermally reactive and crosslinkable moieties similar to that of phenylethynyl (PE) is disclosed. Processes of making and using such low-molecular-weight, main-chain thermotropic liquid-crystalline co-polyimides are also provided.

8 Claims, 8 Drawing Sheets

(4 of 8 Drawing Sheet(s) Filed in Color)

(56) References Cited

OTHER PUBLICATIONS

Abbott, A.; Gibson, T.; Tandon, G. P.; Hu, L.; Avakian, R.; Baur, J.; Koerner, H.: Melt extrusion and additive manufacturing of a thermosetting polyimide. Additive Manufacturing 2021, 37, 101636.
Zhang, H.; Wang, W.; Chen, G.; Zhang, A.; Fang, X.: Melt-Processable Semicrystalline Polyimides Based on 1,4-Bis(3,4-dicarboxyphenoxy)benzene Dianhydride (HQDPA): Synthesis, Crystallization, and Melting Behavior. Polymers 2017, 9.
Noël, C.; Navard, P.: Liquid crystal polymers. Progress in Polymer Science 1991, 16, 55-110.
Connell, J. W.; Smith, J. G., Jr.; Hergenrother, P. M.: Oligomers and polymers containing phenylethynyl groups. Journal of Macromolecular Science, Reviews in Macromolecular Chemistry and Physics 2000, C40, 207-230.
Smith, J. G., Jr.; Connell, J. W.: Chemistry and properties of imide oligomers from phenylethynyl-containing diamines. High Performance Polymers 2000, 12, 213-223.
Connell, J. W.; Smith, J. G., Jr.; Hergenrother, P. M.: Properties of imide oligomers containing pendent phenylethynyl groups. High Performance Polymers 1997, 9, 309-321.
Kricheldorf, H. R.: Liquid-crystalline polyimides. Advances in Polymer Science 1999, 141, 83-187.
Takeichi, T.; Tanikawa, M.; Internal Acetylene Unit Linked para to the Aromatic Ring as a Crosslink Site for Polyimide Journal of Polymer Science: Part A: Polymer Chemistry, 1996, vol. 34, 2205-2211.

Meng, Y. Z.; Tjong, S. C.; Hay, A. S.; Morphology, rheological and thermal properties of the melt blends of poly (phthalazinone ether ketone sulfone) with liquid crystalline co polyester Polymer 1998, vol. 39, No. 10, pp. 1845-1850.
Guan, Q.; Picken, S. J.; Sheiko, S. S.; Theo J. Dingemans, T. J.; High-Temperature Shape Memory Behavior of Novel All Aromatic (AB)n-Multiblock Copoly(ester imide)s Macromolecules 2017, 50, 3903-3910.
Liu, S. L.; Chung, T. S.; Geng, J. X.; Zhou, E. L.; Tamai, S.; Phase Transition and Transition Kinetics of a Thermotropic Poly(amide-imide) Derived from 70% Pyromellitic Dianhydride, 30% Terephthaloyl Chloride, and I ,3-Bis [4-(4'-aminophenoxy)cumyl]benzene Macromolecules 2001, 34, 8710-8719.
Guan, Q.; Norder, B.; Chu, L.; Besseling, N. A. M.; Picken, S. J.; Theo J. Dingemans, T. J.; All-Aromatic (AB)n-Multiblock Copolymers via Simple One-Step Melt Condensation Chemistry Macromolecules 2016, 49, 8549-8562.
Tamboli, A. B.; Ghodke, S. D.; Diwate, A. V.; Joshi, M. D.; Ubale, V. P.; Maldar, N. N.: Processable poly (ether ether ketone imide)s. High Performance Polymers 2021, DOI: 10.1177/09540083211055044.
U.S. Appl. No. 16/752,794.
U.S. Appl. No. 16/752,804.
U.S. Appl. No. 18/103,860.
Asanuma, T.; Oikawa, H.; Ookawa, Y.; Yamasita, W.; Matsuo, M.; Yamaguchi, A.: Synthesis of thermotropic liquid crystal polyimide and its properties. Journal of Polymer Science, Part A: Polymer Chemistry 1994, 32, 2111-18.
Zheng, B.; Ree, B.; Yu, Z.; Tan, L.; Koerner, H.; Development of high-performance nematic liquid crystalline polyimides (LCPI) for 3D printing, Presentation Aug. 2022.

* cited by examiner

HIGHLY AROMATIC AND LIQUID-CRYSTALLINE CO- POLYIMIDES ENDCAPPED WITH AROMATIC GROUPS AND CROSSLINKED PRODUCTS THEREFROM

CROSS-REFERENCE TO RELATED APPLICATION

The present application claims priority to U.S. Provisional Application Ser. No. 63/406,006 filed Sep. 13, 2022, the contents of which is hereby incorporated by reference in their entry. The present application is related to, but does not claim priority to, U.S. application Ser. No. 14/999,921 which was filed under a secrecy order on Jan. 25, 2017.

RIGHTS OF THE GOVERNMENT

The invention described herein may be manufactured and used by or for the Government of the United States for all governmental purposes without the payment of any royalty.

FIELD OF THE INVENTION

The present invention relates to crosslinkable, low-molecular-weight, main-chain thermotropic liquid-crystalline co-polyimides and processes of making and using same.

BACKGROUND OF THE INVENTION

Applicants disclose a family of low-molecular-weight, main-chain thermotropic liquid-crystalline co-polyimides (TLC-CoPI) that are crosslinkable, and based on a unique, liquid-crystallinity (LC)-enabling diamine, namely, 1,3-bis[4-(4'-aminophenoxy)cumyl]benzene (BACB) and two or more mesogenic dianhydrides, at least one of which is a diphthalic dianhydride (DPA) that contains one or more thermally reactive and crosslinkable moieties similar to that of phenylethynyl (PE). A thermally non-crosslinkable mesogenic dianhydride can be pyromellitic dianhydride (PMDA), terphenyl dianhydride (TPDA) or a combination of both. In addition, the thermally crosslinkable TLCP-PI is endcapped by either a non-reactive anhydride such as phthalic anhydride (PA) or thermally reactive one such as 4-phenylethynylanhydride (PEPA). The LC transition temperatures of our TLCP-CoPI, particularly those based on TPDA (TLC-isotropic is ~265° C.) and PE-DPA (TLC-isotropic is ~236° C.) are well below the that of high-molecular-weight thermotropic liquid-crystalline PMDA-BACB (TLC-isotropic ~310° C.) and the curing temperatures of thermosetting polyimides ($T_{(cure)onset}$>300° C.). This feature has the flexibility advantage in modifying the ink materials to meet varying processing conditions in additive manufacturing of devices and components that require high-temperature polymers.

SUMMARY OF THE INVENTION

A family of low-molecular-weight, main-chain thermotropic liquid-crystalline co-polyimides (TLC-CoPI) that are crosslinkable, and based on a unique, liquid-crystallinity (LC)-enabling diamine, namely, 1,3-bis[4-(4'-aminophenoxy)cumyl]benzene (BACB) and two or more mesogenic dianhydrides, at least one of which is a diphthalic dianhydride (DPA) that contains one or more thermally reactive and crosslinkable moieties similar to that of phenylethynyl (PE) is disclosed. Processes of making and using such low-molecular-weight, main-chain thermotropic liquid-crystalline co-polyimides are also provided.

Additional objects, advantages, and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate embodiments of the present invention and, together with a general description of the invention given above, and the detailed description of the embodiments given below, serve to explain the principles of the present invention.

DETAILED DESCRIPTION OF THE INVENTION

Definitions

Figure 1:
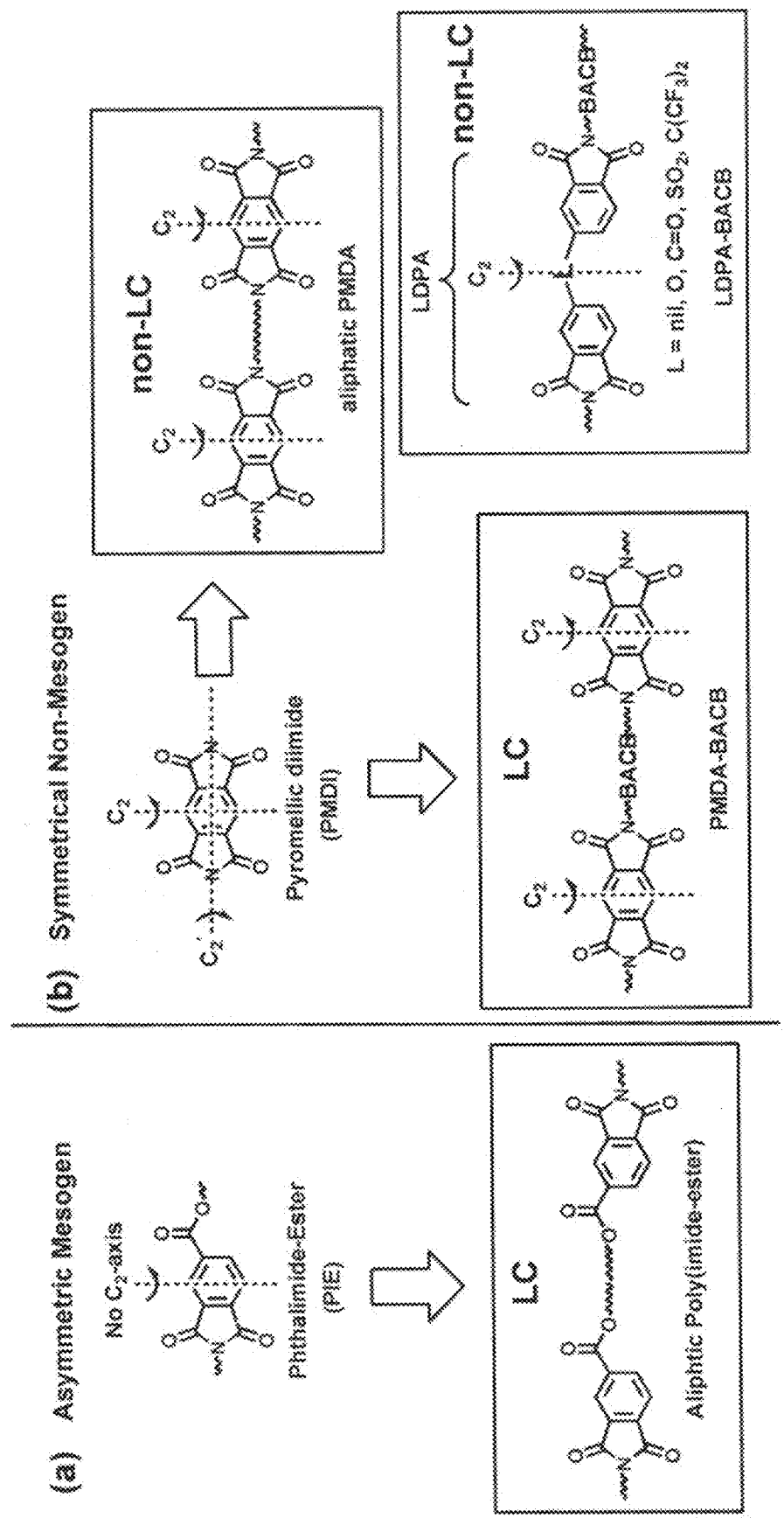
FIG. 1 depicts the structural comparisons of (a) an asymmetric phthalimide-ester (PIE) mesogen and (b) the symmetrical pyromellitimide, PMDI and linked diphthalic dianhydride (LDPA). and (in boxes) the corresponding repeat units in their polyimides that are liquid crystalline (LC) or non-LC. The linking group (L) is generally a short linker and the wavy symbol represent flexible chains such as $(CH_2)_n$, —$(CH_2CH_2O)_n$—. BACB is a highly aromatic and flexible linker derived from the diamine, 1,3-bis[4'-(4"-aminophenoxy)cumyl]benzene.

Unless specifically stated otherwise, as used herein, the terms "a", "an" and "the" mean "at least one".

As used herein, the terms "include", "includes" and "including" are meant to be non-limiting.

As used herein, the words "about," "approximately," or the like, when accompanying a numerical value, are to be construed as indicating a deviation as would be appreciated by one of ordinary skill in the art to operate satisfactorily for an intended purpose.

As used herein, the words "and/or" means, when referring to embodiments (for example an embodiment having elements A and/or B) that the embodiment may have element A alone, element B alone, or elements A and B taken together.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

BACB is the abbreviation for "1,3-bis[4-(4'-aminophenoxy)cumyl]benzene" moiety

DPA is the abbreviation for Di-(Phthalic Dianhydride) or diphthalic dianhydride.

DSC is the abbreviation for Differential scanning calorimetry.

EDPA is the abbreviation for compound with a chemical name of "ethynyl-4,4'-di(phthalic anhydride)."

EFPE-DPA is the abbreviation for compound with a chemical name of "4,4'-(2-fluoro-1,4-phenylene)bis(ethyne-2,1-diyl)diphthalic anhydride."

1,4EPE-DPA is the abbreviation for compound with a chemical name of "4,4'-(1,4-phenylenebis(ethyne-2,1-diyl)) diphthalic anhydride."

1,3EPE-DPA is the abbreviation for compound with a chemical name of "4,4'-(1,3-phenylenebis(ethyne-2,1-diyl)) diphthalic anhydride."

EPPE-DPA is the abbreviation for compound with chemical names of "4'-((3,4-dicarboxyphenyl)ethynyl)biphenyl-3,4-dicarboxylic dianhydride," and "4,4'-(biphenyl-4,4'-diyl-bis(ethyne-2,1-diyl))diphthalic anhydride."

LC is the abbreviation for liquid-crystalline or liquid-crystallinity.

LDPA is the abbreviation for linked di(phthalic dianhydride) moiety.

MPDA: for multi-phenoxy-linked 4,4'-dianiline.

PE-DPA or PEDPA is the abbreviation for compound with a chemical name of "4'((3,4-dicarboxyphenyl)ethynyl)biphenyl-3,4-dicarboxylic dianhydride."

PIE is the abbreviation for "phthalimide-ester" moiety.

PMDA is the abbreviation for pyromellitic dianhydride.

PMD is the abbreviation for: pyromellitimide moiety.

PO is the abbreviation for: Polarization Optical Microscopy.

NR-DPA is the abbreviation for Non-Reactive Di-(Phthalic Dianhydride).

R-DPA is the abbreviation for Reactive Di-(Phthalic Dianhydride).

TPDA is the abbreviation for compound with a chemical name of "terphenyl-3,3",4,4"-dianhydride".

TLC is the abbreviation for thermal crystalline or thermal crystallinity.

PA is the abbreviation for phthalic anhydride.

PEPA is the abbreviation for 4-phenylethynylphthalic anhydride

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Additive manufacturing or 3-dimensional (3D) printing makes three-dimensional objects by building up material, based upon design data provided from a computer aided design (CAD) system. One technique is to deposit a resolidifiable material in a predetermined pattern, according to design data provided from a CAD system, with the build-up of multiple layers forming the object. The resolidifiable "ink" materials can be either in the form of filaments or powdered resins.

Fused Filament Fabrication (or FFF) is one type of additive manufacturing (AM) technique. Materials used for fused filament fabrication are typically thermoplastic (linear) polymers in the form of filaments. The filaments are melted in a "printer" head and extruded onto a deposition surface, and form a solid layer upon cooling. Multiple layers are deposited one atop the other. The complete ensemble of the layers forms the 3-dimensional article.

Selective Laser Sintering (SLS) is another type of AM technique that uses a laser as the power source to sinter powdered material, aiming the laser focus automatically at points in space defined by a 3D model, binding the material together to create a solid structure. For hot environment applications such as those that can be found in aerospace applications, state of the art 3D printed thermoplastic articles lack key properties that enable use as engine externals or brackets and fixtures in cooler sections of an engine, ducting for cabin air, etc. Currently, the commonly used thermoplastic materials used in FFF or SLS technology are limited in use temperature and have poor thermo-oxidative stability. For example, state-of the-art 3D filament printable aerospace grade thermoplastics such as ULTEM™ 1010, and ULTEM™ 9085 have use temperatures of 190° C. and 160° C., respectively, and are susceptible to creep during the 3D printing process. These thermoplastic melts are isotropic, that is they are not liquid-crystalline.

Accordingly, there is a need for new materials and methods for use in FFF, SLS, and other additive manufacturing techniques that demonstrate improved thermal stability, possess higher service-temperatures and have processibility like thermotropic liquid-crystalline polymers (TLCP). In TLCP systems, because of the generally lower melt viscosity associated with columnal or anisotropic flow as the result of the polymer-chain alignment in the liquid crystalline phase, which would likely to occur in the nozzle of a 3D printer, it is expected that liquid-crystalline character of the ink materials and ability to tailor such character would be advantageous to the above-mentioned additive manufacturing methods.

Liquid-Crystallinity. An important requirement in the processing of thermotropic liquid-crystalline polymer (TLCP) is having a workable LC temperature window ($\geq 20°$ C.) for the TLCP to sustain the LC phase or anisotropy via dynamic molecular ordering and occurring well below a prescribed temperature for the onset of a well-defined crosslinking reaction in continuing heating to the temperature range well before the onset of anticipated degradation of polymer chains; or upon cooling at the end of LC mesophase that can result in a semicrystalline morphology. Both covalently crosslinked (amorphous) and (non-covalently crosslinked) semicrystalline products are known to possess improved mechanical, thermal and solvent resistant properties than the analogous TLCPs that are non-crosslinked and amorphous.

In thermotropic LC polymers, the transition temperatures from a crystal phase to a liquid crystal phase (LC), which may consist of one or more distinctly different LC textures observed under a polarized optical microscope (OPM), and finally to an isotropic phase, are strongly dependent on the molecular structures of mesogenic component and polymer chain as well as the molecular weight, as indicated by the work of S. Hocine and M.-H Li, Soft Matter 2013, vol. 9, pp. 5839-5861. The LC temperature range is generally determined from the onset temperature at which the crystalline phase (ordered and rigid) of LCP begins to transform to liquid-crystalline phase (ordered but mobile) to the temperature at which significant amount of isotropic melt (biphasic) is observed. This former temperature is denoted as "crystal-to-liquid-crystal" or $T_{Crys\text{-}Lc}$, and the latter is designated as $T_{iso}$.

For thermotropic LCP, there are generally two types of LC morphology depending on the structures driven by the dynamics of the molecular-to-meso-scale arrangements of the mesogenic units in the polymer chains. When the morphology of the LC phase shows only an orientational ordering of the mesogenic units in the LCP following a general direction or a director, and no positional ordering, this relatively simple LC phase is designated as "nematic" phase. On the other hand, the morphology of LC phase designated as "smectic" mesophase is more complex. It has a lamellar or layered structure that is characterized by the state of being both orientationally and positionally ordered, in which the mesogens self-organize in parallel layers. In addition, the general orientation of the parallel mesogens in one layer with respect to similarly parallel mesogens in the next layers can be "in-line" (Smectic-A), "offset" (Smectic B) or "offset and tilted" (Smectic C). Therefore, for the smectic morphology, one or more thermal and associated phase transition temperatures may be observed between $T_{Crys\_cL}$ and $T_{iso}$.

The viscosity of the LC phase is a critical determinant in enhancing the processing ease for thermotropic LCP into fibers or oriented films. The macromolecules of LCPs are very stiff and generally have a rigid-rod structure. These rod-like macromolecules tend to align more easily than the coil-like macromolecules of amorphous thermoplastics along the flow or sheer direction under appropriate processing conditions. In comparison with typically linear thermoplastic polymers, the melt viscosity of LCP is generally lowered when they are molecularly aligned; and in many cases, a small amount of LCP added to thermoplastic polymers can result in a significantly lower melt viscosity in comparison to the pure melt of the thermoplastics, as illustrated by the work of Y. Z. Meng, et al. Polymer 1998, vol. 39, pp. 1845-1850.

A special class of thermotropic liquid-crystalline polymer (TLCP) is the main-chain polyimides (PI) which are typically synthesized from the polycondensation of an aromatic dianhydride and a diamine. These traditional thermotropic liquid-crystalline polyimides (TLCP-PI) are constituted by (i) the rigid dianhydride being the mesogen capable of self-aggregation to form the so-called liquid-crystalline (LC) phase, i.e., a mesophase which is a phase between crystal and isotropic melt phases; (ii) the diamine being the flexible and thermally mobile to facilitate the self-aggregation of the mesogenic units. From the structural standpoint of mesogenic anhydrides, there are generally two approach to the synthesis of thermotropic liquid-crystalline polyimides (TLC-PI), namely the utilization of mesogens that are either symmetrical dianhydrides such as pyromellitic dianhydride (PMDA), 3,4,3',4'-biphenyltetracarboxylic dianhydride (BPDA) and TPDA whose symmetry is defined by having a $C_2$-rotation molecular axis and unsymmetrical di(anhydride-ester) with the generic structure, AE-L-AE, in which the AE is an unsymmetrical anhydride, and L is a bivalent linking group (see FIG. 1 for the corresponding imide structures). Other symmetrical dianhydrides are 3,4,3',4'-benzophenone tetracarboxylic dianhydride (BTDA), 3,4,3',4'-diphenylsulfone tetracarboxylic dianhydride (BSDA) and 4,4'-oxy-di(phthalic anhydride) (ODPA). There have been a number of systematic studies conducted on the syntheses and TLC correlation of various aromatic-aliphatic semirigid polyimides composed of these symmetrical dianhydrides and aliphatic chains in the main chains. A general finding is that most of them are crystalline; and because of their poor mesogenic properties, they are unable to show TLC properties without the inclusion of a traditional biphenyl mesogen in the polymer backbones; thus poly(ester-imides) and poly(carbonate-imides) that were composed of asymmetric N-phenylphthalimide rings form LC phases. For examples, the work of M. Sato, et al. High Performance Polymers 1998, 10, 155-162, and that of T. Inoue, et al. Macromolecules 1995, vol. 28, pp. 6368-6370, have shown that the-thermotropic liquid crystals for the simple polyimides which consist of symmetrical imide rings and polymethylene spacers appear to be only that derived from TPDA and 1,11-diaminoundecane.

Pyromellitic dianhydride (PMDA) is a common, structurally rigid dianhydride, and the key building block for the well-known aromatic polyimide, namely Kapton, which is a semi-crystalline polymer. As illustrated by the work of H. R. Kricheldorf, et al. Makromolekulare Chemie, 1993, vol. 194, pp 1209-24, and that of M. Sato, et al. Polymer Journal 2002, vol. 34, pp. 158-165, while PMDA meets the structural rigidity of being an LC mesogen, a large number of polyimides and poly(ester-mide)s derived from PMDA and aliphatic components only form isotropic (non-LC) melts. Therefore, it was rather unusual that a thermotropic liquid-crystalline polyimide (TLC-PI) was reported in 1994 by Asanuma et al. Journal of Polymer Science, Part A: Polymer Chemistry 1994, 32, 2111-18. This particular polyimide, designated as PMDA-BACB, was synthesized from PMDA and a highly aromatic but flexible diamine, namely, 1,3-bis [4'-(4"-aminophenoxy)cumyl]benzene (BACB).

However, while PMDA-BACB polyimide is a thermotropic liquid crystalline polymer, its LC phase can be achieved at temperatures well above 300° C. and the associated melt viscosity is deemed impractical for the 3D-printing of thermoplastic or thermosetting polyimides. These processing issues are stemming from the exceeding strong propensity of the PMDA moieties to aggregate. Therefore, there is a need for non-PMDA dianhydrides that can lead to LC phase at or below 300° C. and/or are capable of thermal crosslinking at temperatures after LC transition temperatures.

Non-PMDA mesogenic dianhdrides with higher aspect ratios: A special family of rigid dianhydrides is based on α,ω-diphthalic dianhydride (DPA) motif, designated here as L(DPA), with the generic structure,

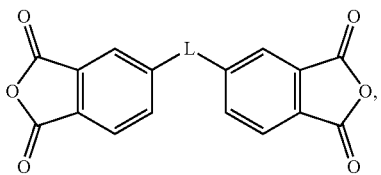

and formula as PA-L-PA, where PA is phthalic anhydride and L is direct bond or an aromatic and/or conjugated connector. The simplest L(DPA) dianhydride, namely, BPDA (3,3',4,4'-biphenyltetracarboxylic dianhydride; L=direct bond) is not mesogenic even when combined with the very flexible aliphatic, α,ω-$(CH_2)_n$, chains to enable the resulting polyimides to be thermotropic liquid-crystalline (TLC). As shown in our work, when the two PA units are connected by the most rigid two-carbon unit, namely the ethynyl bridge, the resulting ethynyl-diphthalic dianhdride) or EDPA in combination with the LC-promoting, highly aromatic diamine BACB, the resulting polyimide, EDPA-BACB is also not mesogenic.

However, when the two PA units are connected by a longer paraphenylene bridge, the resulting "higher-aspect-ratio" dianhydride, namely, TPDA (3,3',4,4'-p-terphenyltetracarboxdianhydride; L=paraphenylene) and diamines containing similar aliphatic chains did indeed result in TLC-polyimides, as shown by the work of M. Sato, et al. Macromolecular Chemistry and Physics 1996, vol. 197, pp. 2765-2774.

Composition and Synthesis of New Crosslinkable Thermotropic Polyimides: In this disclosure, we show that certain non-PMDA dianhydrides in combination with BACB can also form thermotropic LC polyimides. In an embodiment, certain bis(phthaalic dianhydrides) or DPA's with higher aspect ratios than BPDA and BTDA (Table 2) when in combination with BACB can result in a new family of thermotropic LC-PI's. In yet another embodiment, when endcapped with thermally crosslinkable functional group such as phenyethynyls, the resulting BACB-based reactive oligoimides are thermotropic liquid-crystalline that can be cured in isotropic polyimide thermosets.

Molecular Weight Dependency of Thermotropic Liquid Crystallinity (TLC). Unlike small-molecule liquid-crystals which have polydispersity (PD) or molecular weight distribution (MWD) of unity, linear and thermotropic liquid crystalline polymers (TLCP) are characterized by having MWD values dictated by the polymerization conditions. Therefore, the thermal-transition and morphological characteristics of the corresponding liquid-crystalline phase are also dependent on the MWD of TLCP. Similar to the thermal-transition temperatures for amorphous and semi-crystalline polymers, there is generally a linear correlation between molecular weight and the transition temperatures of thermotropic LCP, including those of the mesophase transitions. Therefore, for consistency in studying the effect of changing the dianhydride from PMDA to those of bis (phthalic diahydride) or DPA with various linking group (L) in BACB-containing and low-molecular weight polyimides (hereafter generically referred to as "imide oligomers" or "oligoimides"), degree of polymerization (DP) or theoretical number of repeating units (n) is set at 12

Figure 2:
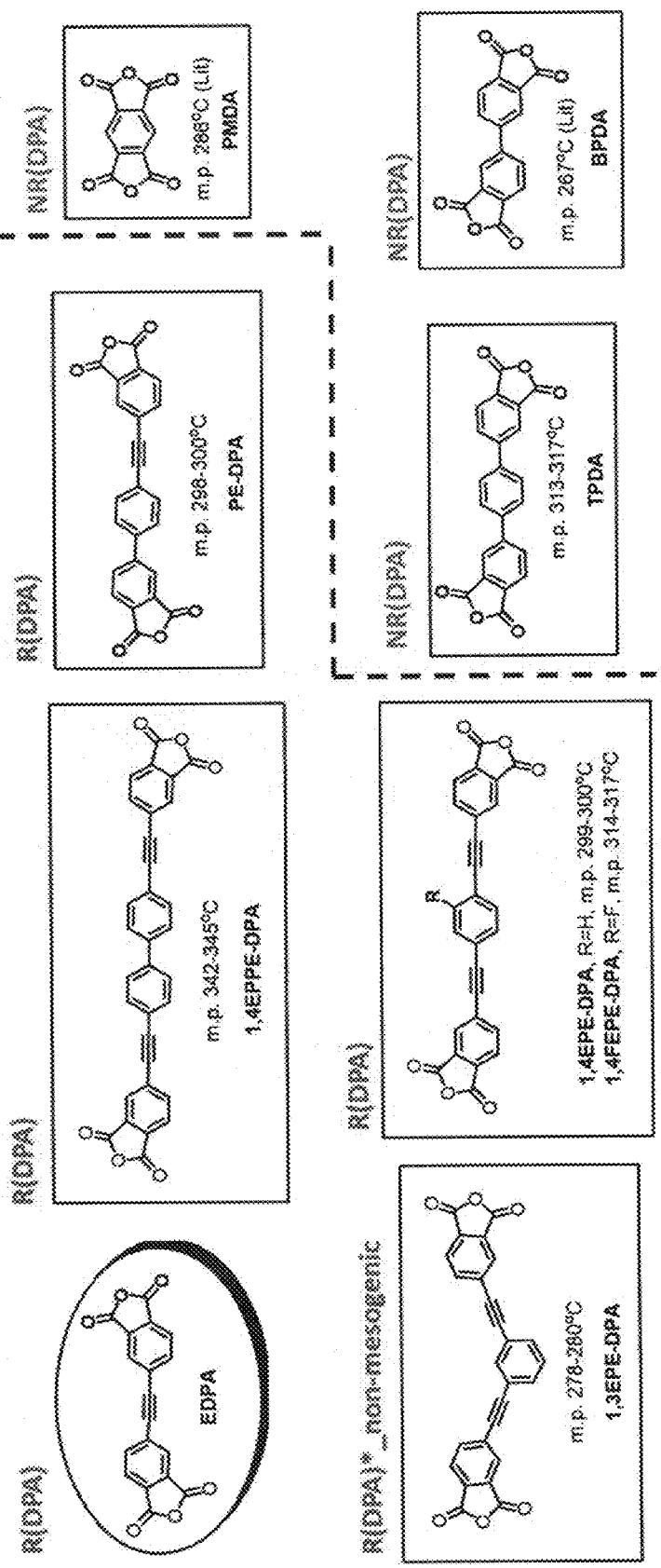
FIG. 2 depicts some examples of Reactive and Non-reactive Mesogenic Dianhydrides (R-DPA & NR-DPA)

Reactive and Non-reactive Mesogenic Dianhydrides (R-DPA & NR-DPA): Our non-PMDA mesogens, i.e., L(DPA)$_2$, belong to a family of aromatic rod-like dianhydrides with the general composition and formula of (PA)-L-(PA), where PA is phthalic anhydride and L is rigid connector such as an ethynyl (E), a paraphenylene (P), or a rigid moiety of a P-E combination; L can be divided into a reactive (R) group that contains one or more thermally reactive ethynyl (E) units, and non-reactive (NR) group when does not contain any ethynyl (E) unit such as the paraphenylene (P) and fluoro-substituted paraphenylene (PF). The generic structure is similar to that in FIG. 1(b) except that L is a rigid bridging group instead of the flexible group made up by polymethylene or polyoxyethylene chains. Structures of representative examples of reactive and non-reactive mesogenic dianhydrides are shown in FIG. 2.

Aromatic Endcappers. The use of thermally reactive 4-ethynylphthalic anhydride (PEPA) and non-reactive phthalic anhydride (PA) as endcapping agents would allow the control of the crosslinking density of L(DPA)$_2$-containing TLC-PI products. Thus, when the PE moiety are present in both the backbone and the termini of TLC-PI, higher crosslinking density is expected than when PE is only present in the polymer backbone.

Composition and Preparation of BACB-Copolyimides. Accordingly, two series of crosslinkable TLC-PI copolymers based on PMDA and one of the non-PMDA dianhydrides can be designed with the following generic composition and structures: (i) Phthalic anhydride or PA-endcapped series: PA-[(BACB-RDPA)p-(BACB-PMDA)q]n-PA (ii) 4-ethynylphthalic anhydride, or PEPA-endcapped series: PEPA-[(BACB-NRDPA)p-(BACB-PMDA)q]n-PEPA where RDPA is thermally a reactive mesogenic dianhydride and NRDPA is a nonreactive one.

Figure 3:
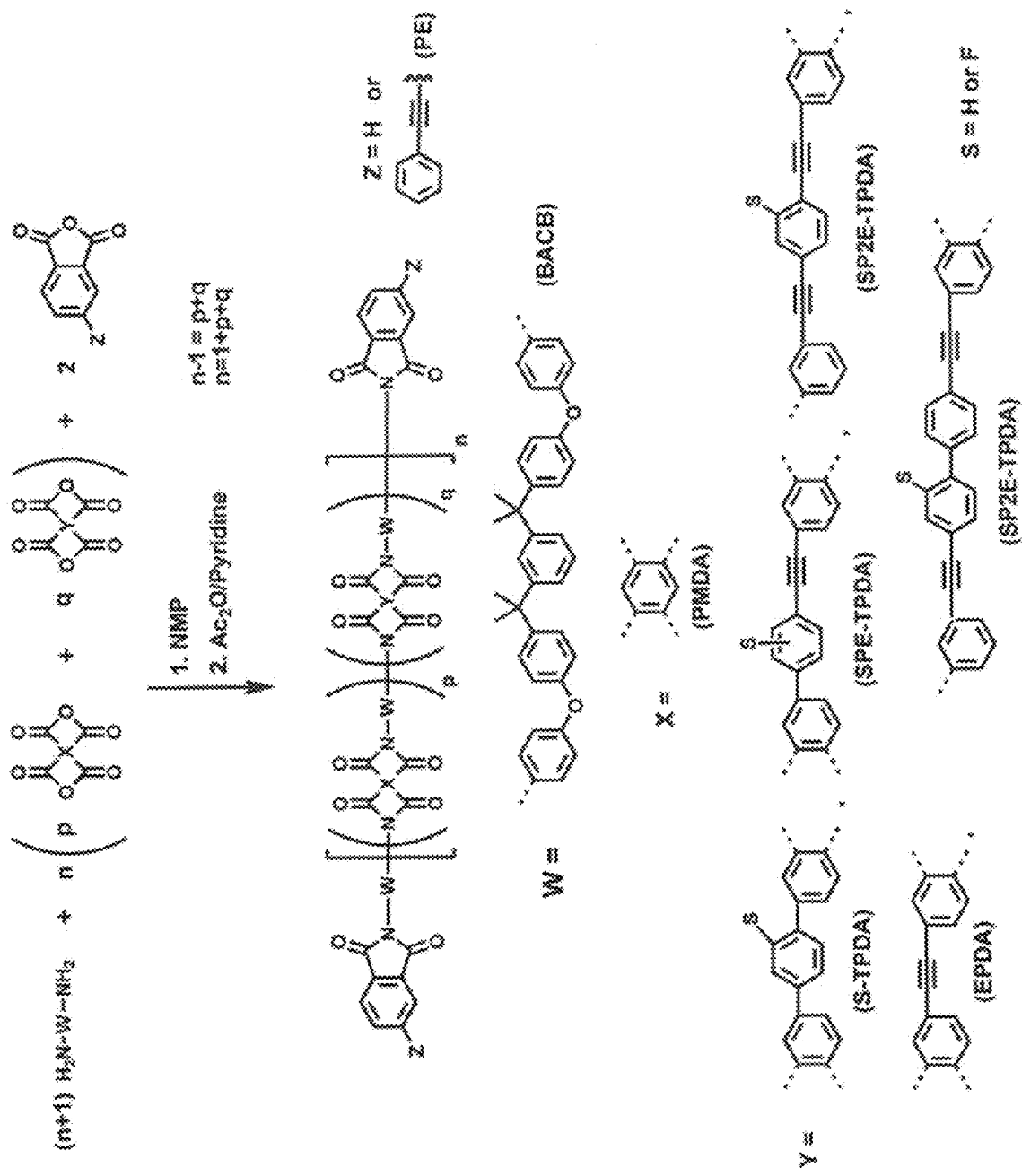
FIG. 3 depicts the generic scheme for the syntheses of two series of the (BACB-XDPA)-(BACB-PMDA) copolymers with either phthalimide (PhI) or 4-phenylethynylphthalimide (PEPI) endgroup.

The syntheses of two series of the (BACB-RDPA)-(BACB-PMDA) copolymers with either phthalimide (PhI) or 4-phenylethynylphthalimide (PEPI) endgroup are outlined in the scheme depicted in FIG. 3.

The concept of liquid-crystalline and crosslinkable co-polyimides was demonstrated by the copolymer compositions constituted by BACB diamine and two dianhydride co-monomers, namely, thermally nonreactive PMDA and thermally reactive EDPA. It has been demonstrated that the homopolyimide, PA-[BACB-PMDA]$_{12}$-PA is thermotropic liquid-crystalline and the thermally crosslinkable homopolyimide PA-[BACB-EDPA]$_{12}$-PA is not. In addition, EDPA is more costly than PMDA and therefore there is an economic incentive to achieve both TLC and crosslinkabilty in copolymer compositions.

Figure 4:
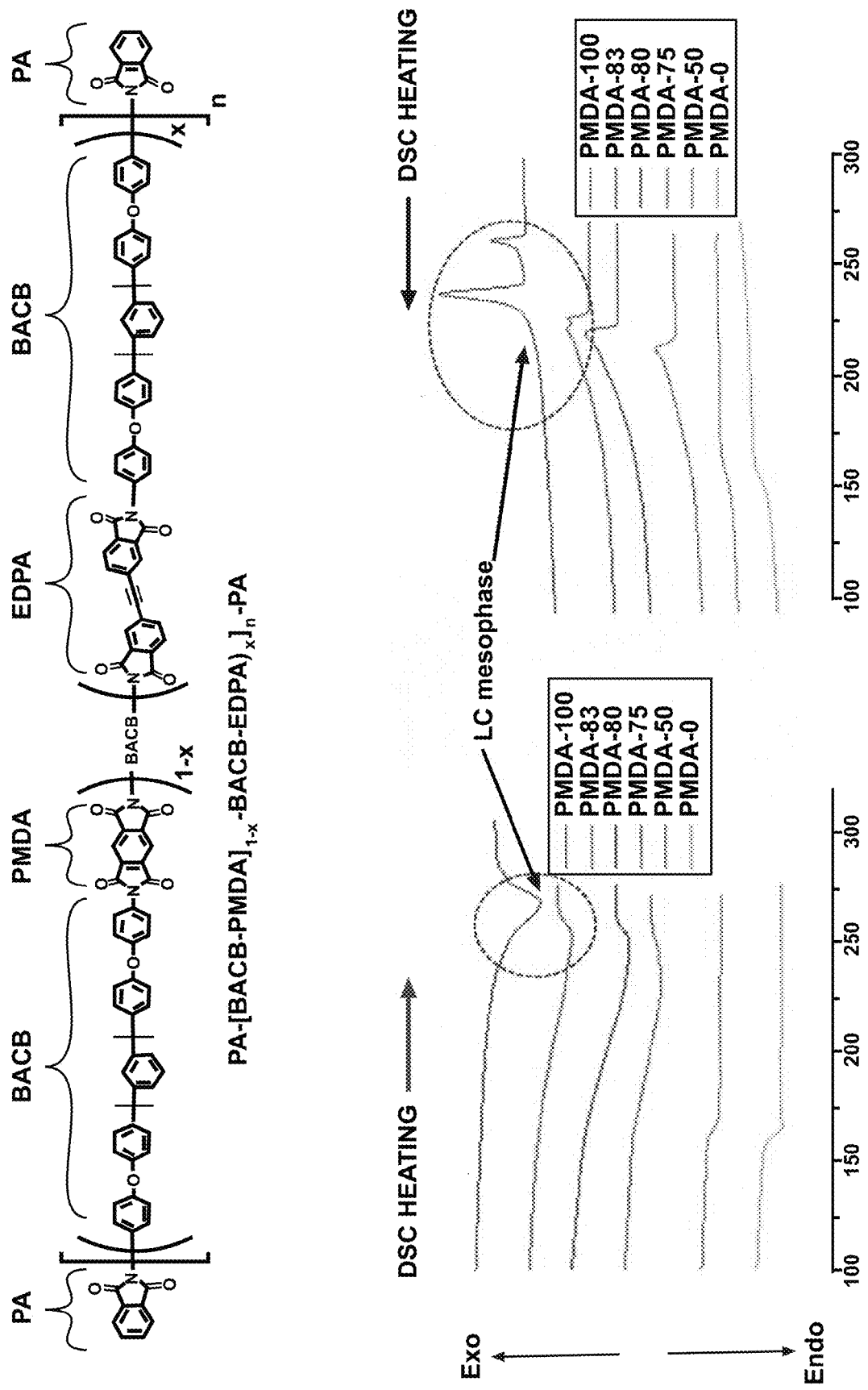
FIG. 4 depicts DSC (a) heating and (b) cooling traces of phthalic anhydride (PA)-endcapped copolyimides which dianhydride component has been systematically altered from that of the thermotropic PMDA-BACB homopolyimide by replacing PMDA with thermally reactive EDPA dianhydride.

Phthalic anhydride (PA)-endcapped liquid crystalline and copolymers of BACB-PMDA and BACB-EPDA. With reference to Table 1 and FIG. 4, a series of phthalic anhydride (PA) endcapped, low molecular weight BACB-containing copolymers has been synthesized with various complementary molar ratios of PMDA and EDPA while keeping the degree of polymerization (DP) to 12. The purpose of this experiment is to determine quantitatively the diluting effect of EDPA on the thermotropic liquid crystallinity of BACB-PMDA-PA oligoimide. Thus, the combined techniques of differential scanning caloriemetry (DSC) and polarizing optical microscopy (POM) have been used to assess these characteristics of the copolyimides. The results indicate that the TLC property of BACB-PMDA-PA oligo-imide can tolerate 17-20 mol % of random presence of EDPA component in the polyimide backbone. This observation led to the conception that regular presence of the combined ethynyl and paraphenylene in the linkage of a bis(phthalic anhydride) would likely preserve the thermotropic liquid-crystallininy of bis(phthalic anhydride)-derived aromatic polyimides.

TABLE 1 summarized the stoichiometry of PMDA:EDPA in the series of phthalic anhydride endcapped copolymers, PA-[(BACB-PMDA)$_{1-x}$(BACB-EDPA)$_x$]-PA. and their thermal transition data from DSC and morphological character assessed in conjunction with polarizing optical microscopy (POM).

| Sample ID | PMDA (1 − x) mol % | $T_g$ (° C.) | $T_m$ (° C.) | $T_{L-i}$ (° C.) | $T_{i-L}$ (° C.) | $T_c$ (° C.) | Phase |
|---|---|---|---|---|---|---|---|
| 07-001-1 | 0 | 163.5 | ND | ND | ND | ND | Amorphous |
| 07-005-2 | 50 | 164.4 | ND | ND | ND | ND | Amorphous |
| 07-005-1 | 75 | 169.0 | 220.3 | NA | NA | 221.4 | Crystalline |
| 07-009-1 | 80 | 179.0 | 242.2 | NA | N?A | 229.3 | Crystalline |
| 07-009-2 | 83 | 199.5 | 244.6 | N/A | 235.7 | 230.1 | Liquid crystalline & Crystalline |
| 06-99-1 | 100 | 190.8 | 255.0 | N/A | 272.7 | 247.1 | Liquid crystalline & Crystalline |

Figure 5:
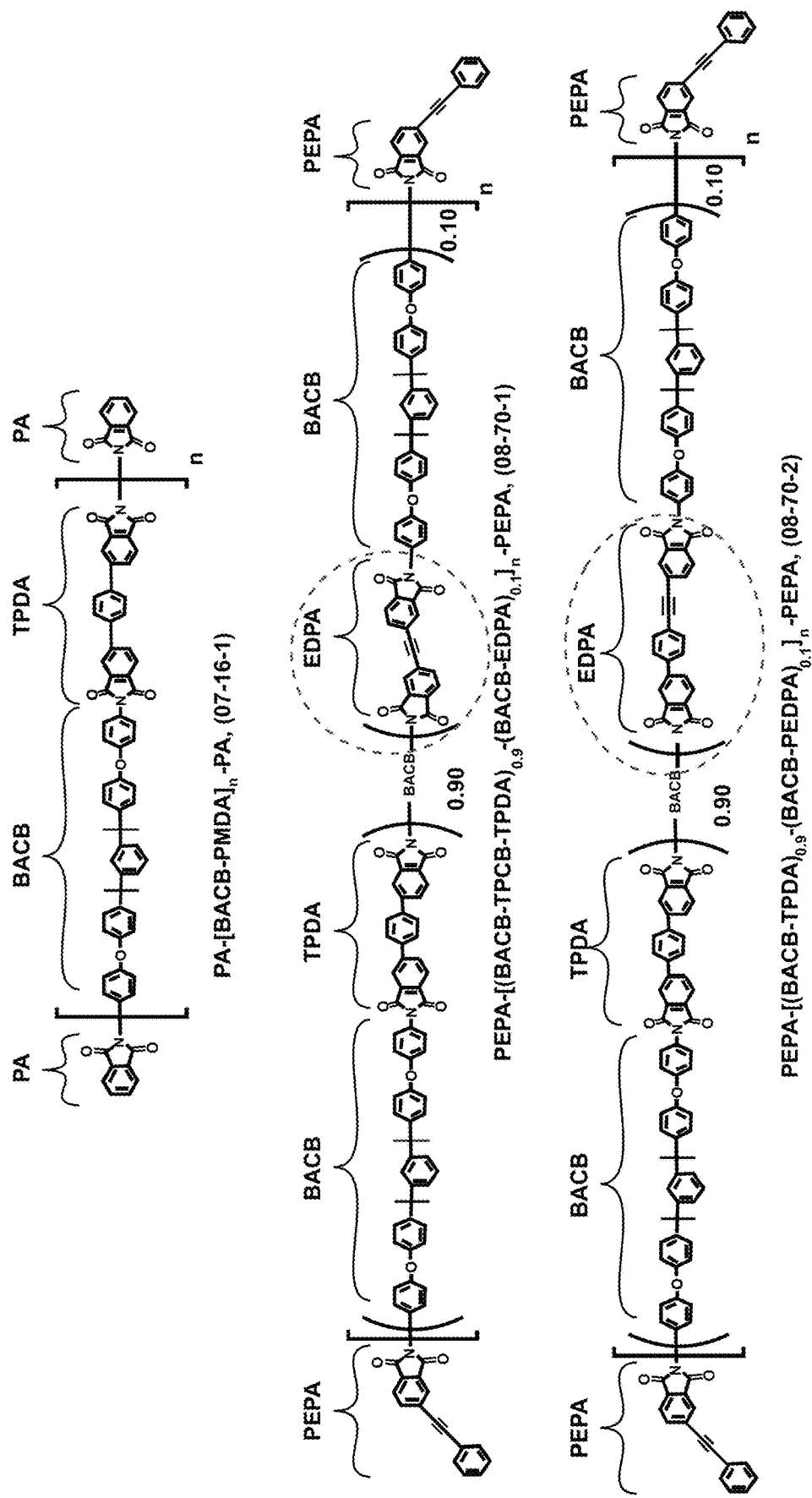
FIG. 5 depicts the structures of liquid-crystalline BACB-based copolyimides that are thermally crosslinkable (indicated by red-dashed circles) in contrast to the non-reactive BACB-based homopolymer.

4-Phenylethynyl phthalic anhydride (PEPA)-endcapped liquid crystalline and crosslinkable copolymers of the following repeating units (i) BACB-TPDA and BACB-EPDA; and (ii) BACB-TPDA and BACB-PEPDA. Two examples (Table 2) to illustrate all the possibilities of crosslinking reactions occurring between the phenylethynyl (PE) groups in the polymer backbone (main-chain) or at the termini (chain-ends). Since the BACB-TPDA-PA homopolymer (sample 07-16-1) had been shown to be thermotropic liquid crystalline, it was chosen to be the TLC component of the copolymers, and the thermally reactive dianhydrides, EDPA and PEDPA were selected and incorporated into crosslinkable components, namely BACB-EDPA (sample 08-70-1) and BACB-PEDPA (sample 08-70-2). The structures of these comparative TLC-PIs are shown in FIG. 5.

TABLE 2

The thermal transition data from DSC and morphological character ("Phase") assessed in conjunction with polarizing optical microscopy (POM) for the PA-endcapped BACB-TDPA-containing homopolyimide and PEPA-endcapped copolyimide.

| ID | $T_g$ (° C.) | $T_m$ (° C.) | $T_{L-i}$ (° C.) | $T_{i-L}$ (° C.) | $T_c$ (° C.) | Phase |
|---|---|---|---|---|---|---|
| 07-16-1 BACB-TDPA-PA | 164.4 | 246.8 | 265.2 | 260.0 | 242.7 | Liquid Crystalline & Crystalline |
| 08-70-1 | 154.1 | ND | 252.0 | 244.3 | ND | Liquid Crystalline |
| 08-70-2 | 164.2 | ND | 264.7 | 258.1 | ND | Liquid Crystalline |

Figure 6:
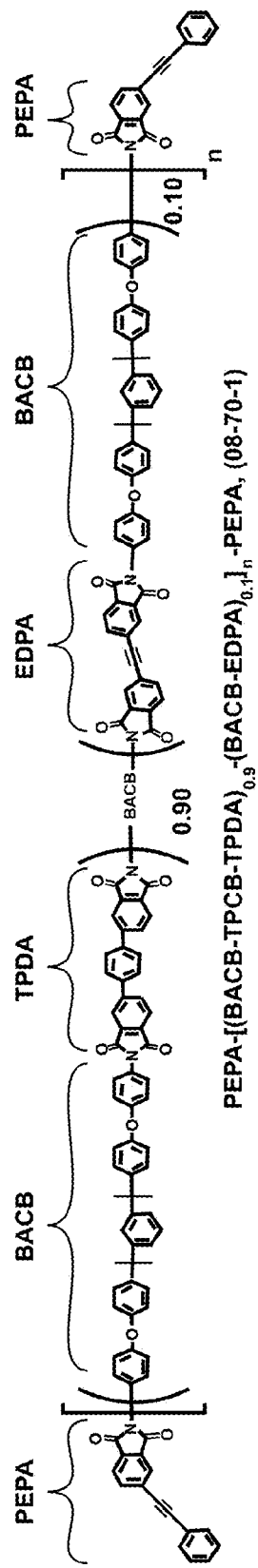
FIG. 6 depicts (a) DSC scans in heating to (black) and cooling from (red) 280° C. of sample 08-70-1 to detect phase transitions; (b) POM images of cooling 08-70-1 isotropic melt from 280° C. and taken at different temperatures, indicating liquid crystalline phase ~250-264° C. before phenylethynyl (PE) crosslinking occurring curing at temperature above 310° C. and (c) Initial DSC scan of 08-70-2 to 475° C. to detect phase transitions and PE crosslinking reaction and rescan of the cured sample to 400° C.
Figure 6:
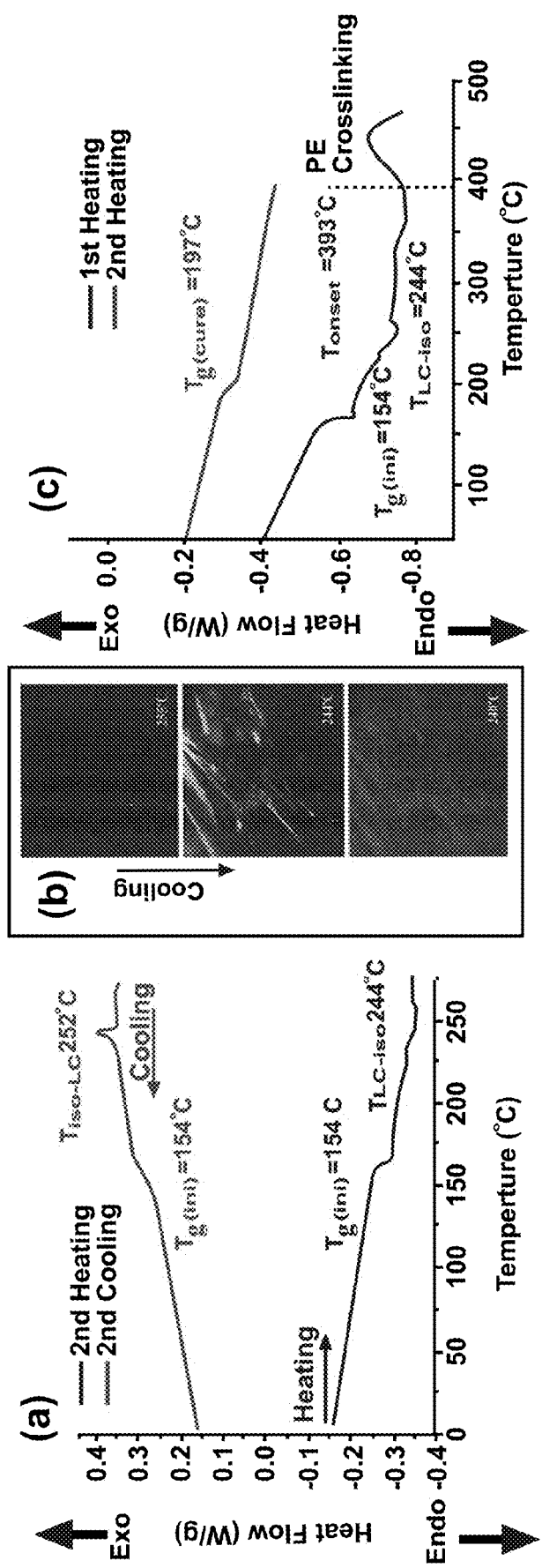
Figure 7:
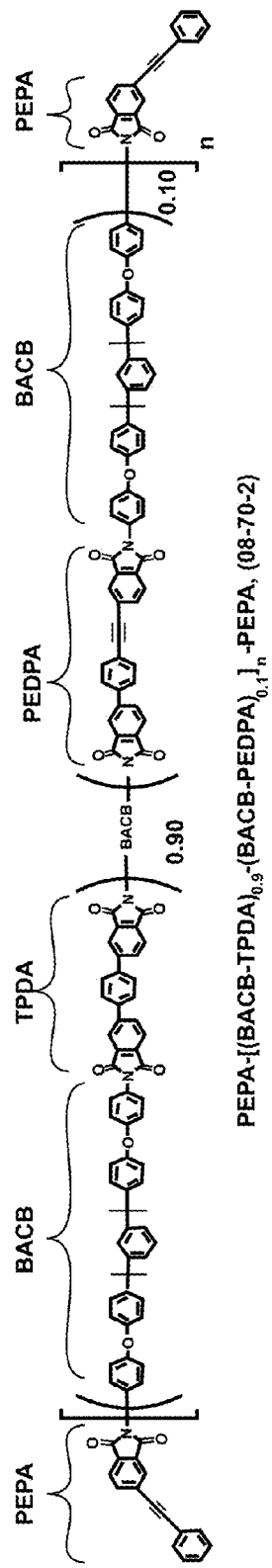
FIG. 7 depicts (a) DSC scans in heating to (black) and cooling from (red) 280° C. of sample 08-70-2 to detect phase transitions before the PE crosslinking event; (b) POM images of cooling 08-70-2 isotropic melt from 280° C. and taken at different temperatures, indicating liquid crystalline phase ~250-264° C. before phenylethynyl (PE) crosslinking occurring curing at temperature above 310° C. and (c) Initial DSC scan of 08-70-2 to 475° C. to detect phase transitions and PE crosslinking reaction and rescan of the cured sample to 400° C.
Figure 7:
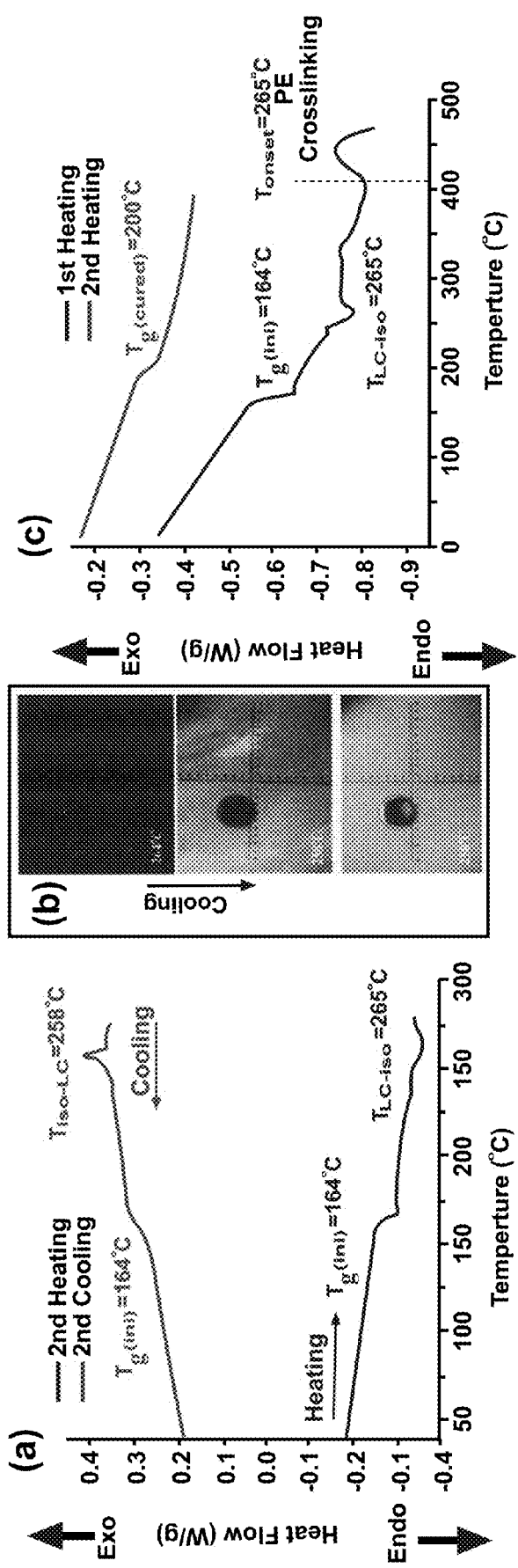
Figure 8:
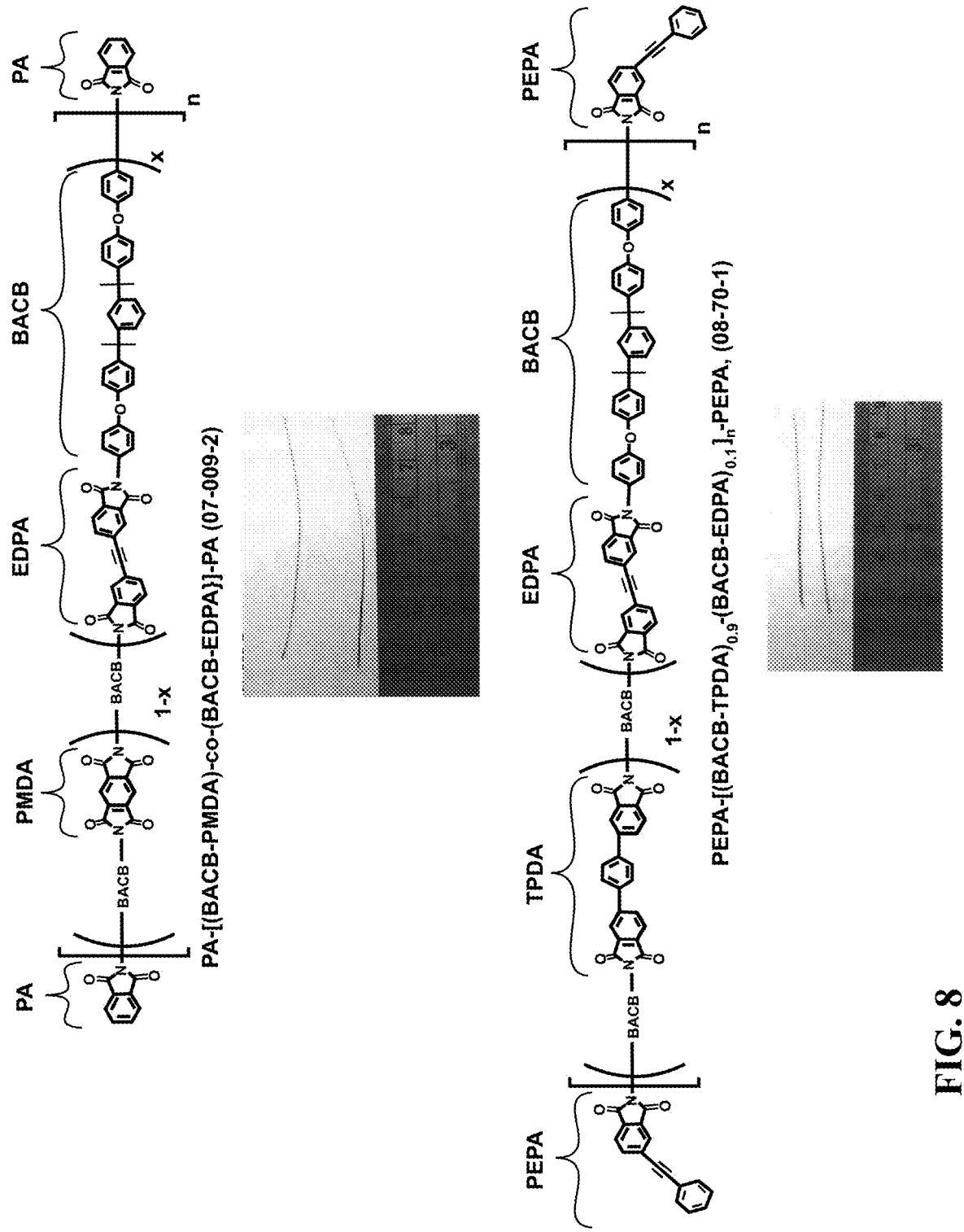
FIG. 8 depicts the pulled fibers from the polymer melts of [PMDA-co-EDPA(10 mol %)/BACB]-PA (07-009-2) at 280-300° C. and [TPDA-co-EDPA(10 mol %)/BACB]-PAa(08-70-1) at 260-280° C.

FIG. 6 depicts (a) DSC scans in heating to (black) and cooling from (red) 280° C. of sample 08-70-1 to detect phase transitions; (b) POM images of cooling 08-70-1 isotropic melt from 280° C. and taken at different temperatures, indicating liquid crystalline phase ~250-264° C. before phenylethynyl (PE) crosslinking occurring curing at temperature above 310° C. and (c) Initial DSC scan of 08-70-2 to 475° C. to detect phase transitions and PE crosslinking reaction and rescan of the cured sample to 400° C. These observations are summarized in Table 3.

TABLE 3

Thermal reactivities of PEPA-encapped BACB-EDPA-and BACB-PEDPA liquid-crystalline oligoimides are indicated by their relative values of onset temperature: higher temperature, lower reactivity and vice versa.

| Sample ID | $T_g$ Before Curing (° C.) | Curing Onset Temperature (° C.) | Curing Peak Temperature (° C.) | $T_g$ After Curing (° C.) |
|---|---|---|---|---|
| 08-70-1 | 154.1 | 393.4 | 445.1 | 196.8 |
| 08-70-2 | 164.3 | 407.9 | 446.6 | 199.6 |

Thermal Chemistry of Phenylethynyl Group. According to Connell, Smith, and Hergenrother, Journal of Macromolecular Science, Reviews in Macromolecular Chemistry and Physics 2000, vol. C40, pp. 207-230, the thermal reaction of phenylethynyl (PE) groups when attached to the chain-ends or side-chains of a linear oligomer or polymer, it is thermochemically stable up to 300° C. When the PE-containing units are more spatially constrained (i.e. with both ends tied) in the main chain of the polymer than their counterparts at the chain-ends or side-chains (i.e. each with one end free of constraint), their resistance to thermal crosslinking is significantly increased with their reactivity concomitantly delayed to higher temperatures (≥350° C.), as illustrated by the work of T. Takeichi and M. Tanikawa, Journal of Polymer Science Part A: Polymer Chemistry 1996, vol. 34, pp. 2205-2211. The data in Table 3 show that the onset temperatures of the internal ethynyl groups in L(DPA) are well above 300° C., allowing the flexibility to coordinate LC phase and crosslinking conditions by molecular engineering.

Highly Aromatic and Liquid-Crystalline Co-Polyimides Endcapped with Aromatic Groups and Processes of Making and Using Same For purposes of this specification, headings are not considered paragraphs. In this paragraph, Applicants disclose a copolymer having the following formula:

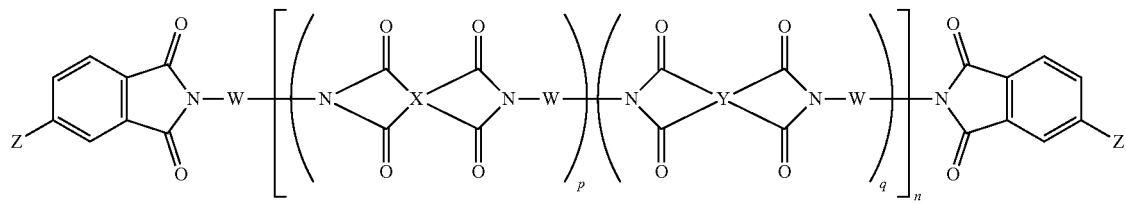

wherein
n is an integer from 1 to 100, preferably n is an integer from 4 to 20, more preferably n is an integer from 6 to 18;
each p is 0 or 1; each q is 0 or 1 with the proviso the at least one p is 1 and at least one q is 1;
W has the following formula:

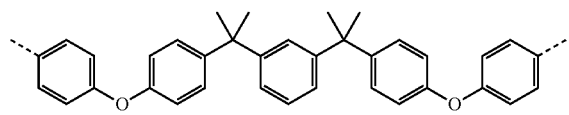

all X moieties in said copolymer are identical, said X moieties having one of the two formula below wherein R is H Me, OMe, CN or F, preferably R is H, Me, OMe or F, more preferably R is H, Me or F, most preferably R is H or F,

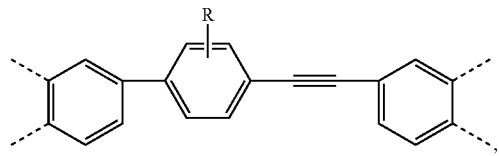

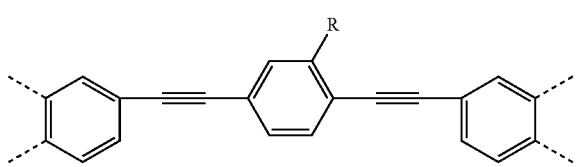

all Y moieties in said copolymer are identical, said Y moieties having one of the three formula below wherein R is H Me, OMe, CN or F, preferably R is H, Me, OMe or F, more preferably R is H, Me or F, most preferably R is H or F,

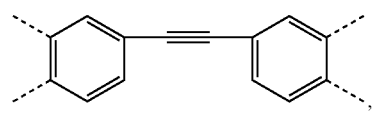

each Z is independently hydrogen or has the following structure

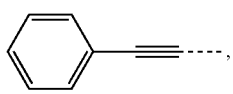

preferably each Z has the following structure

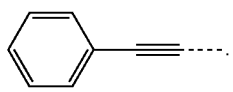

Applicants disclose the copolymer of the previous paragraph, said copolymer having a single glass transition temperature (Tg).

Applicants disclose the copolymer of the previous two paragraphs wherein for the combined molar amount of X plus Y, the molar fraction of X is greater than zero but less than 1, preferably said molar fraction is from about 0.5 to about 0.99, more preferably said molar fraction is from about 0.8 to about 0.95.

Examples

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

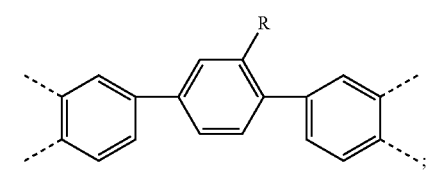

Example 1: Synthesis of PA-Endcapped Copolyimide Comprised of the Repeating Units of [BACB-PMDA], and [BACB-EDPA]

The preparation of the phthalic anhydride (PA)-endcapped co-polyimides, PA-[(BACB-PMDA)$_{1-x}$(BACB-EDPA)$_x$]$_n$-PA oligomers was standardized and conducted according to the feeding ratios in Table 6. The total amount of dianhydride co-monomers was scaled down to and kept constant at 2.000 mmol for all copolyimide samples prepared.

TABLE 6

Calculated feed ratios of dianhydrides (PMDA and EDPA), diamine (BACB), and endcapping reagent (PA) for the preparation of the PA-[(BACB-PMDA)$_{1-x}$(BACB-EDPA)$_x$]$_n$-PA copolyimides, for which the degree of polymerization ($X_n$) is kept at n = 12, according to Carothers Equation.

| Sample ID (BACB-PMDA mol %) | PMDA (mol) | EDPA (mol) | BACB (mol) | PA (mol) |
|---|---|---|---|---|
| 07-001-1 (0%) | 0 | 12 | 13 | 2 |
| 07-005-2 (50%) | 6 | 6 | 13 | 2 |
| 07-005-1 (75%) | 9 | 3 | 13 | 2 |
| 07-009-1 (80%) | 9.6 | 2.4 | 13 | 2 |
| 07-009-2 (83%) | 10 | 2 | 13 | 2 |
| 06-99-1 (100%) | 12 | 0 | 13 | 2 |

Representative Procedure: Synthesis of PA-Endcapped Copolyimide Comprised of the Repeating Units of 50 Mol % of [BACB-PMDA], and 50 Mol % of [BACB-EDPA] (Polymer 07-005-2 in Table 6)

To a 100 mL round-bottomed flask equipped with a nitrogen inlet, 1.1455 g (2.167 mmol) of 1,3-bis[4-(4'-aminophenoxy)cumyl]benzene (BACB) and 18 grams of 1-methyl-2-pyrrolidinone (NMP) were charged. The mixture was stirred at room temperature until all solids were dissolved. 0.3182 g (1.000 mmol) of 4,4'-(ethyne-1,2-diyl)diphthalic anhydride (EDPA) and 0.2181 g (1.000 mmol) of pyromellitic dianhydride (PMDA) charged. The mixture was stirred at room temperature for 8 hours before 49.4 mg (0.333 mmol) of phthalic anhydride (PA) was added. The mixture was stirred for 16 more hours at room temperature. Then, 2.0 mL of pyridine and 2.4 ml of acetic anhydride (Ac$_2$O) was added. The mixture was stirred at room temperature for additional 24 hours. If gel formed during this stage of the polymer-synthesis process, the mixture would be heated to 100° C. and held at this temperature for 4 hours. The mixture was poured into a beaker of 2-propanol to precipitate the product. The polymer product was collected on a filter funnel, washed with fresh 2-propanol, and air dried. The complete drying of the polymer product was conducted at 130° C. in a vacuum oven at 0.5 torr for 24 hours.

Example 2 Synthesis of PEPA-Endcapped Copolyimide Comprised of the Repeating Units of [BACB-TPDA]_ and [BACB-EDPA]

The preparation of the 4-phenylethynylphthalic anhydride (PEPA)-endcapped co-polyimides, PEPA-[(BACB-PMDA)$_{1-x}$(BACB-EDPA)$_x$]$_n$-PEPA oligomers was standardized and conducted according to the feeding ratios in Table 7. The total amount of dianhydride co-monomers was scaled down to and kept constant at 2.000 mmol for all copolyimide samples prepared.

TABLE 7

Molar feeding ratio of dianhydrides (TPDA & EDPA), diamine (BACB) and PEPA endcapper for the copolymer synthesis

| Sample ID | TPDA | EDPA | PEDPA | BACB | PEPA |
|---|---|---|---|---|---|
| 08-70-1 | 10.8 | 1.2 | 0 | 13 | 2 |
| 08-70-2 | 10.8 | 0 | 1.2 | 13 | 2 |

Example 2(a) Synthesis of PEPA-Endcapped Copolyimide Comprised of the Repeating Units of 90 Mol % [BACB-TPDA]- and 10 Mol %[BACB-EDPA], (Copolyimide Sample 08-70-1)

To a 100 mL round-bottomed flask equipped with a nitrogen inlet, 1.1455 g (2.167 mmol) of 1,3-bis[4-(4'-aminophenoxy)cumyl]benzene (BACB) and 18 grams of 1-methyl-2-pyrrolidinone (NMP) were charged. The mixture was stirred at room temperature until all solids were dissolved. Then, 63.6 mg (0.200 mmol) of 4,4'-(ethyne-1,2-diyl)diphthalic anhydride (EDPA) was added to the solution. After 5 minutes of stirring, 0.666 g (1.800 mmol) of [1,1':4',1''-terphenyl]-3,3'',4,4''-tetracarboxylic acid dianhydride (TPDA) was added. The reaction mixture was stirred at room temperature for 8 hours before 82.7 mg (0.333 mmol) of 4-phenylethynylphthalic anhydride (PEPA) was added. The mixture was further stirred for 16 hours at room temperature. Then, 2.0 mL of pyridine and 2.4 ml of acetic anhydride was added. The mixture was poured into a beaker of 2-propanol to precipitate the product. The polymer product was collected on a filter funnel, washed with fresh 2-propanol, and air dried. The complete drying of the polymer product was conducted at 130° C. in a vacuum oven at 0.5 torr for 24 hours.

Example 2(b) Synthesis of PEPA-Endcapped Copolyimide Comprised of the Repeating Units of 90 Mol % [BACB-TPDA]- and 10 Mol %[BACB-PEDPA], (Copolyimide Sample 08-70-2)

To a 100 mL round-bottomed flask equipped with a nitrogen inlet, 1.1455 g (2.167 mmol) of 1,3-bis[4-(4'-aminophenoxy)cumyl]benzene (BACB) and 18 grams of 1-methyl-2-pyrrolidinone were charged. The mixture was stirred at room temperature until all solids were dissolved. Then, 78.9 mg (0.200 mmol) of 4'-((3,4-dicarboxyphenyl)ethynyl)biphenyl-3,4-dicarboxylic dianhydride (PEDPA) was added. After 5 minutes of stirring. 0.666 g (1.800 mmol) [1,1':4',1''-terphenyl]-3,3'',4,4''-tetracarboxylic acid dianhydride (TPDA) was added. The polymerization mixture was stirred at room temperature for 8 hours before 82.7 mg (0.333 mmol) of 4-phenylethynylphthalic anhydride (PEPA) was added. The reaction mixture comprising of polyamic acid precursor was further stirred for 16 hours at room temperature. Then, 2.0 mL of pyridine and 2.4 ml of acetic anhydride was added. The final polymerization mixture was stirred at room temperature for additional 24 hours. The mixture was poured into a beaker of 2-propanol to precipitate the product. The polymer product was collected on a filter funnel, washed with fresh 2-propanol, and air dried. The complete drying of the polymer product was conducted at 130° C. in a vacuum oven at 0.5 torr for 24 hours.

TABLE 8

Thermal properties before Copolymers cured compared to homopolymer

| ID | $T_g$ (°C.) | $T_m$ (°C.) | $T_{LC-i}$ (°C.) | $T_{i-LC}$ (°C.) | $T_c$ (°C.) | Phase |
|---|---|---|---|---|---|---|
| 07-16-1 | 164.4 | 246.8 | 265.2 | 260.0 | 242.7 | Liquid Crystalline & Crystalline |
| 08-70-1 | 154.1 | ND | 252.0 | 244.3 | ND | Liquid Crystalline |
| 08-70-2 | 164.2 | ND | 264.7 | 258.1 | ND | Liquid Crystalline |

TABLE 9

Crosslinked related thermal properties of copolymers

| Sample ID | $T_g$ (ini) (°C.) | Curing Onset Temperature (°C.) | Curing Peak Temperature (°C.) | $T_g$ (cured) (°C.) |
|---|---|---|---|---|
| 08-70-1 | 154.1 | 393.4 | 445.1 | 196.8 |
| 08-70-2 | 164.3 | 407.9 | 446.6 | 199.6 |

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and process, and illustrative examples shown and described. Accordingly, departures may be made from such details without departing from the scope of the general inventive concept.

What is claimed is:

1. A copolymer having the following formula:

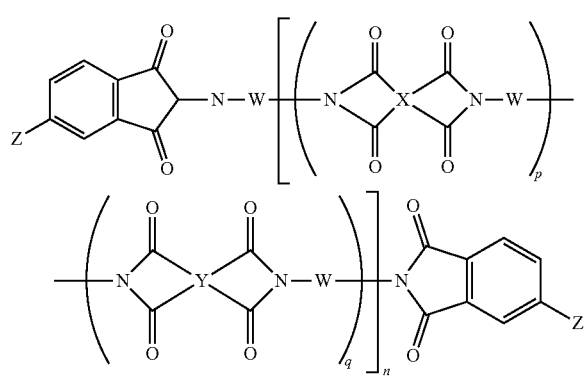

wherein n is an integer from 1 to 100;

each p is 0 or 1; each q is 0 or 1 with the proviso the at least one p is 1 and at least one q is 1;

W has the following formula:

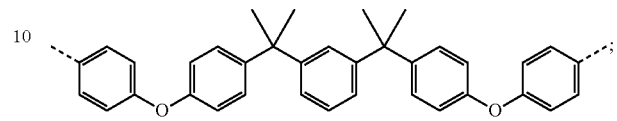

all X moieties in said copolymer are identical, said X moieties having one of the two formula below wherein R is H Me, OMe, CN or F,

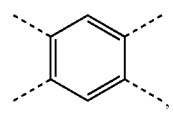

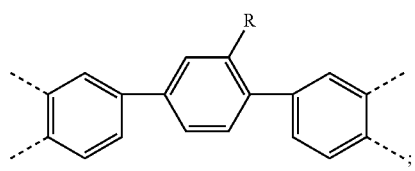

all Y moieties in said copolymer are identical, said Y moieties having one of the three formula below wherein R is H Me, OMe, CN or F,

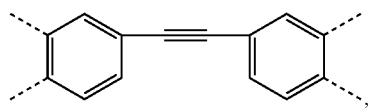

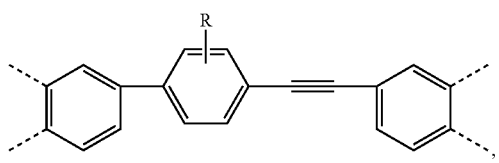

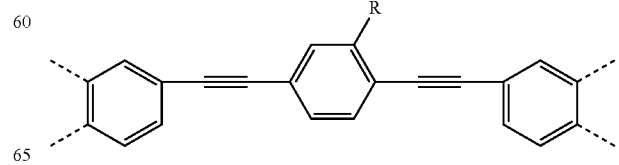

each Z is independently hydrogen or has the following structure

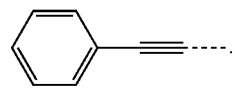

2. The copolymer of claim 1, said copolymer having a single glass transition temperature (Tg).

3. The copolymer of claim 1 wherein n is an integer from 4 to 20, and for X, R is H, Me, OMe or F and for Y, R is H, Me, OMe or F.

4. The copolymer of claim 1 wherein n is an integer from 6 to 18 and for X, R is H, Me or F and for Y, R is H, Me or F.

5. The copolymer of claim 1 wherein for X, R is H or F and for Y, R is H or F.

6. The copolymer of claim 1 wherein for the combined molar amount of X plus Y, the molar fraction of X is greater than zero but less than 1.

7. The copolymer of claim 6 wherein said molar fraction is from about 0.5 to about 0.99.

8. The copolymer of claim 7 wherein said molar fraction is from about 0.8 to about 0.95.

* * * * *